Feb. 5, 1935.  R. H. ULRICH  1,989,956
METHOD OF MAKING TIRES
Filed July 27, 1933   2 Sheets-Sheet 1

INVENTOR
Rudolf H. Ulrich
BY
ATTORNEYS

Feb. 5, 1935.  R. H. ULRICH  1,989,956
METHOD OF MAKING TIRES
Filed July 27, 1933  2 Sheets-Sheet 2
Fig.-3
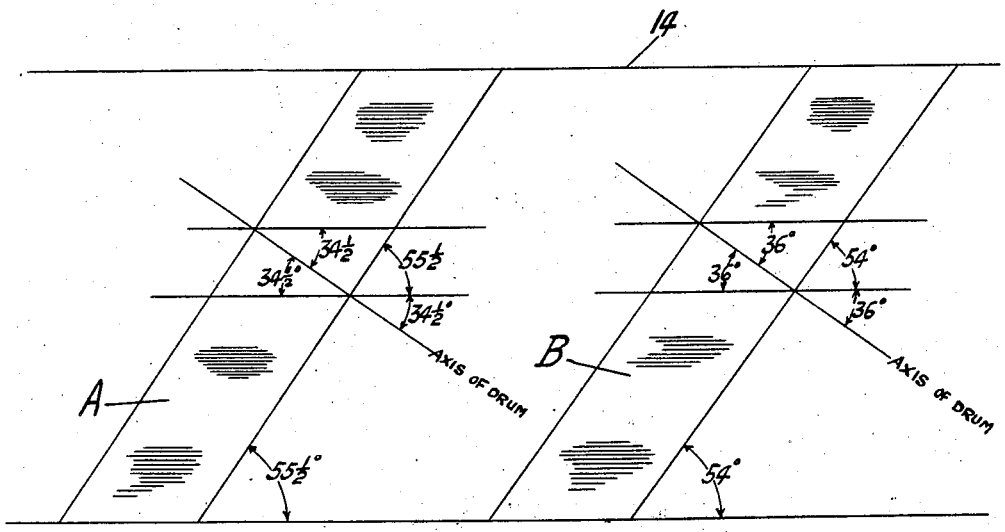
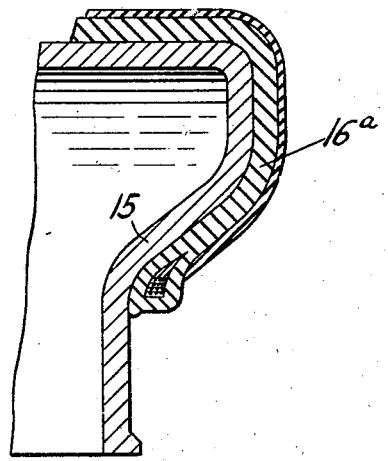
Fig.-4
INVENTOR
RUDOLF H. ULRICH
BY Ely & Barrow
ATTORNEYS

Patented Feb. 5, 1935

1,989,956

UNITED STATES PATENT OFFICE 1,989,956

METHOD OF MAKING TIRES

Rudolf H. Ulrich, Akron, Ohio, assignor to The Firestone Tire & Rubber Company, Akron, Ohio, a corporation of Ohio Application July 27, 1933, Serial No. 682,452

6 Claims. (Cl. 154—14)

This invention relates to methods of making tires, and more especially it relates to improved procedure for making pneumatic tires of large size and heavy thick wall construction, employing either single or twin beads.

In the manufacture of twin-bead pneumatic tires of the character mentioned by the pulley band or drum-built method, it is customary, in the fabricating of the tire, to mount the pair of bead cores on each side of the tire in the same relative positions that they occupy in the finished tire since the respective bead cores of each pair cannot move relatively to each other during the shaping of the pulley band to tire form. The tires are fabricated upon building forms or drums that are essentially similar to the drum shown in U. S. Patent No. 1,242,073 to James D. Tew, issued October 2, 1917. The method may also be employed in the manufacture of single bead tires where it may be advantageous to use this type of drum, as for example, to avoid excessive shifting of cords and plies or to increase the cord count of the tire as compared to a tire built on an entirely flat drum.

Tire bands constructed on drums of the type mentioned have substantially cylindrical medial portions and inwardly extending marginal portions, the latter including respective tire beads comprising bead cores disposed substantially in the same positions they will have in the finished tire. The juncture of the medial portion of the tire and the respective marginal portions thereof defines an angle or radius less than the radius of the finished tire and in the subsequent shaping of the tire band to generally circular transverse shape, the straightening out of the tire body plies tends to create tension in the plies originally on the inner side of the neutral axis of flexure and compression of the plies on the outer side of said neutral axis.

During the shaping of the band to tire form which may be accomplished by known pneumatic or mechanical methods, the plies of the tire are stretched or tensioned, and there is a shifting or changing of the angular position of the cords of each ply with relation to the median line of the tire, such shifting being proportionate to the amount of stretch imposed on the plies. The plies of the unvulcanized tire initially are under varying degrees of tension because of the strains incidental to the shaping of the transversely angular tire band to tire shape, as described.

During vulcanization the fabric plies of the tire are determinedly stretched by means of the usual expansible core, to the end that the plies of the finished tire will be under substantially equal tension whereby all of said plies will bear a proportionate share of the load when the tire is inflated. In order, however, for all the plies to be under equal tension when the tire is inflated, it is desirable that the cords of all the plies be disposed at the same angle to the median line of the crown or tread portion of the tire.

The chief object of this invention is to provide an improved method for the manufacture of heavy single or dual-bead tires wherein the cords of all the plies thereof lie at the same angle to the median line of the crown of the finished tire. Other objects will be manifest.

Briefly explained, the invention consists in constructing the tire initially with tire-building bands of cord fabric in which the cord strands are disposed at different angles to the median line of the tire. To obtain the same cord angle in all plies of the finished tire, it is theoretically necessary to start with the cord angle of each ply varying progressively as compared to the cord angle of adjacent plies. In practice, however, the tire is constructed of different groups of tire bands, the cords of the innermost group being more nearly parallel to the axis of the tire than the cords of the outermost group. The illustrative embodiment of the invention shown is a tire comprising twelve cord fabric body plies, of which plies 1 to 8 inclusive have their cords disposed at one angle to the axis of the tire and plies 9 to 12 inclusive have their cords disposed at a different and greater angle thereto, as the inner plies are subjected to tension and the outer plies are subjected to compression.

Of the accompanying drawings:

Figure 3 is a diagrammatic view of a sheet of fabric illustrating the cutting of plies or strips of tire-building material; and Figure 4 is a fragmentary radial section of a tire building form and a single bead tire constructed according to the invention mounted thereon.

Figures 1, 2:
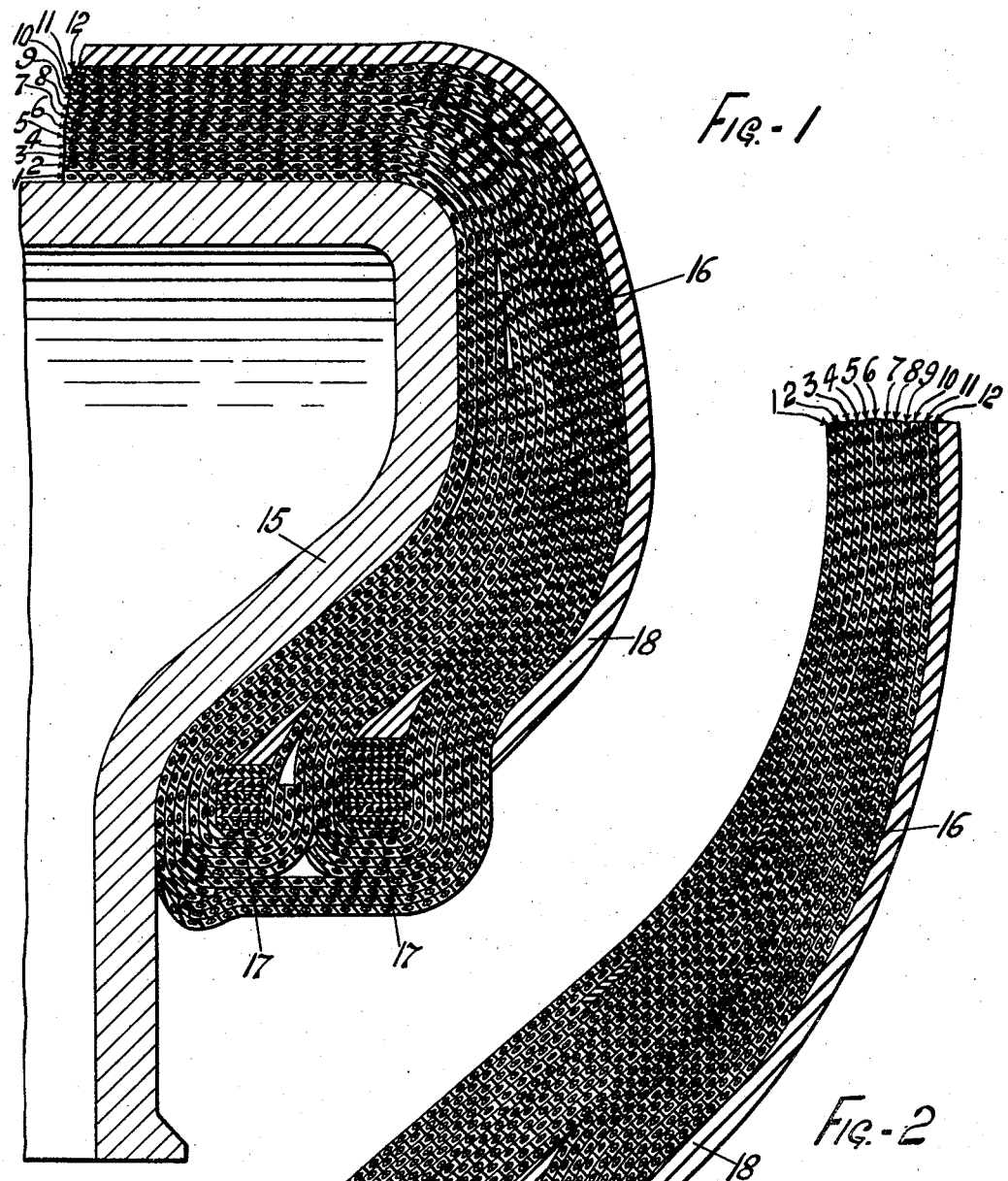
Figure 1 is a fragmentary radial section of a tire-building form or drum, and a twin bead tire constructed according to the invention mounted thereon.
Figure 2 shows the tire section illustrated in Figure 1 as it appears in vulcanized condition.

Referring now to Figure 3 of the drawings, there is shown two strips of tire building material A and B respectively, such as are employed in the manufacture of a tire according to this invention. The fabric 14 is properly rubberized in any known or desired manner. It will be further understood that Figure 3 is accurate only in showing the angles of the cords with relation to the strips since the widths of various plies of a tire vary according to the turn-up at their lateral margins, and the lengths of the plies vary according to the positions of the plies in the tire, the outermost plies being longer.

The cords or strands of the fabric strip A are disposed at an angle of thirty-four and one-half (34½°) degrees to a line at right angles to the center line of the strip, which line is parallel to the axis of a tire building drum when the strip is mounted upon the latter in the building of a tire; in the strip B the strands are disposed at an angle of thirty-six (36°) degrees. The angles noted will, of course, vary in tires of different sizes and different numbers of plies, those stated being substantially correct for the particular tire illustrated herein. To obtain the strips of proper angles, the fabric 14 is cut along lines which are the complements of the desired angles; that is, strips A are cut at an angle of fifty-five and one-half (55½°) degrees to the edges of the fabric and strips B are cut at an angle of fifty-four (54°) degrees.

According to this invention, tire casings are fabricated upon a collapsible tire building form or drum such as that shown at 15, Figure 1, the beads of the tire being disposed on the respective sides of the drum in substantially the positions they occupy in the finished tire, there being a relatively short radius at the juncture of the sides and peripheral face of the drum, which radius causes the bead regions of the tire to be angularly disposed with relation to the medial portion of the tire. The tire on the drum 15 is designated 16, and is composed of 12 plies of body fabric.

In the building of the tire 16, the first eight plies of body fabric applied to the drum have the angles of their cords arranged according to strip A, Figure 3, and the last four plies have the angles of their cords arranged according to strip B. The plies are thus arranged because it has been found that in the subsequent shaping of the tire, the radii or angles at the juncture of the sides and medial regions of the tire are changed. Aside from the novel arrangement of the body plies of the tire, the latter may be constructed in the usual or desired manner with dual or single bead cores 17, 17 on each margin thereof, side walls 18, and breaker strips and tread slab (not shown). Also the bead regions of the tire may include relatively narrow strips of fabric to locally reinforce it and serve to hold together the dual bead cores.

After the tire is removed from the building drum 15, it is shaped to tire form and vulcanized in a mold in the usual manner, a portion of the vulcanized tire being shown in Figure 2. During the shaping of the tire, the inner plies are placed under tension and the outer plies are put under compression. During the vulcanizing of the tire, it is put under internal pressure and stretched by the usual expansible core, and the softening of the rubber in the plies due to the vulcanizing heat permits the cords of the various plies at this time to rearrange their relative positions, with the result that in the finished tire the plies are under substantially uniform tension, and the cords of all the plies are disposed at substantially the same angle with relation to the median line of the crown of the tire.

The invention may be similarly embodied in a single bead tire 16ª as shown in Figure 4.

Modification may be resorted to without departing from the spirit of the invention or the scope of the appended claims.

What is claimed is:

1. The method of making tires which comprises assembling a band of a plurality of rubberized cord fabric plies in superposed relation with the medial portions thereof in transversely flat condition and with the bead regions disposed at an angle to the medial region thereof, the strands of the innermost group of plies being disposed more nearly parallel to the axis of the tire than the strands of the outermost group, shaping the unvulcanized tire band to tire form, whereby said innermost plies are put under tension and said outermost plies are subjected to compression, whereby the cords of the plies are caused to shift their angular positions so as to be substantially uniformly angularly disposed with relation to the median line of the crown of the tire, and then vulcanizing the tire by heat and internal pressure, whereby the cords of the finished tire will be substantially uniformly tensioned.

2. The method of making tires of the pulley band type wherein the bead regions of the tire initially are disposed at an angle to the medial region of the tire, which angles are straightened out when the tire subsequently is shaped to tire form, which comprises constructing the tire of a plurality of plies of rubberized cord fabric of which those plies that are disposed on the radially inner side of the neutral axis of flexure at the said angles of the tire, during the straightening thereof, have their strands disposed more nearly parallel to the axis of the tire than the strands of the plies on the radially outer side of said neutral axis of flexure, forming the unvulcanized pulley band into tire shape, and then vulcanizing.

3. The method of making tires of the pulley band type wherein the bead regions of the tire initially are disposed at an angle to the medial region of the tire, which angles are straightened out when the tire subsequently is shaped to tire form, which comprises constructing the tire of a plurality of plies of rubberized cord fabric of which those plies that are disposed on the concave side of the neutral axis of flexure at the said angles of the tire, during the straightening thereof, have their strands disposed more nearly parallel to the axis of the tire than the strands of the plies on the convex side of said neutral axis of flexure, forming the unvulcanized pulley band into tire shape, simultaneously effecting a rearrangement of the angular positions of the strands of the plies whereby all the strands are substantially uniformly angularly disposed with relation to the median line of the crown of the tire, and vulcanizing the tire.

4. The method of making tires of the pulley band type wherein the bead regions of the tire initially are disposed at an angle to the medial region of the tire, which angles are straightened out when the tire subsequently is shaped to tire form, which comprises constructing the tire of a plurality of plies of rubberized cord fabric of which those plies that are disposed on the concave side of the neutral axis of flexure at the said angles of the tire, during the straightening thereof, have their strands disposed more nearly parallel to the axis of the tire than the strands of the plies on the convex side of said neutral axis of flexure, forming the unvulcanized pulley band into tire shape, and then vulcanizing the tire and concurrently stretching the plies thereof to effect an equalization of the tension of the strands of said plies.

5. The method of making tires which comprises assembling a band of a plurality of rubberized cord fabric plies in superposed relation with the medial portions thereof in transversely flat condition and with the bead regions disposed at an angle to the medial region thereof, the shoulder portion of the band connecting the bead regions to said medial region being disposed at a relatively small radius of curvature, the strands of the innermost group of plies being disposed more nearly parallel to the axis of the tire than the strands of the outermost group, shaping the unvulcanized tire band to tire form to increase the radius of curvature of the shoulder portion of the band, whereby said innermost plies are put under tension and said outermost plies are subjected to compression, whereby the cords of the plies are caused to shift their angular positions so as to be substantially uniformly angularly disposed with relation to the median line of the crown of the tire, and then vulcanizing the tire by heat and internal pressure whereby the cords of the finished tire will be substantially uniformly tensioned.

6. The method of making tires which comprises assembling a band of a plurality of rubberized cord fabric plies in superposed relation with the medial portions thereof in transversely flat condition and with the bead regions disposed at an angle to the medial region thereof, the shoulder portion of the band connecting the bead regions to said medial region being disposed at a relatively small radius of curvature, the strands of the innermost group of plies being disposed more nearly parallel to the axis of the tire than the strands of the outermost group, shaping the unvulcanized tire band to tire form to increase the radius of curvature of the shoulder portion of the band, whereby said innermost plies are put under tension and said outermost plies are subjected to compression, whereby the cords of the plies are caused to shift their angular positions so as to be substantially uniformly angularly disposed with relation to the median line of the crown of the tire, and then vulcanizing the tire.

RUDOLF H. ULRICH.